United States Patent [19]

Matsuoka et al.

[11] Patent Number: 4,522,614
[45] Date of Patent: Jun. 11, 1985

[54] AUTOMATIC TENSION MAINTAINING TRANSMISSION BELT

[75] Inventors: Hiroshi Matsuoka, Iszume; Yutaka Furukawa, Sennan, both of Japan

[73] Assignee: Bando Chemical Industries, Ltd., Kobe, Japan

[21] Appl. No.: 621,439

[22] Filed: Aug. 23, 1984

Related U.S. Application Data

[63] Continuation of Ser. No. 242,928, Mar. 12, 1981, abandoned, which is a continuation-in-part of Ser. No. 958,410, Nov. 7, 1978, abandoned.

[51] Int. Cl.³ .......................... F16G 1/00; F16G 5/00; F16G 9/00; B29D 3/00
[52] U.S. Cl. .................................. 474/260; 474/261; 264/229
[58] Field of Search ............... 474/260, 261, 262, 263, 474/264, 265, 266, 267, 268; 156/137, 138, 139, 160, 161, 165, 229; 264/229; 425/286, 346

[56] References Cited

U.S. PATENT DOCUMENTS

| | | | |
|---|---|---|---|
| 3,416,383 | 12/1968 | Jensen et al. | 474/261 |
| 3,469,001 | 9/1969 | Keefe, Jr. | 264/290 |
| 3,566,706 | 3/1971 | Fix | 74/233 |
| 3,634,572 | 1/1972 | Richmond et al. | 425/28 B |
| 3,813,098 | 5/1974 | Fischer et al. | 156/161 |
| 3,981,206 | 9/1976 | Miranti, Jr. et al. | 474/260 |
| 4,022,070 | 5/1977 | Wolfe | 474/261 |
| 4,083,261 | 4/1978 | Speer et al. | 474/261 |
| 4,137,787 | 2/1979 | Waugh | 74/233 |
| 4,155,791 | 5/1979 | Higuchi | 156/161 |
| 4,266,937 | 5/1981 | Takano | 474/263 |
| 4,305,714 | 12/1981 | Renshaw | 474/261 |

FOREIGN PATENT DOCUMENTS

1190306  5/1970  United Kingdom .................. 74/234

Primary Examiner—Lawrence J. Staab
Assistant Examiner—Michael D. Bednarek
Attorney, Agent, or Firm—Auslander & Thomas

[57] ABSTRACT

An automatic tension maintaining power transmission belt, a method of making the same and a method for maintaining tension in a rubber belt transmission. The belt is made by embedding polyester fiber cord employing a polyester of high relative viscosity and after being subjected to a hot stretching process as a tensile member in rubber forming the belt. The thermal contraction force of the polyester cord is to be substantially maintained by avoiding shrinkage of the belt during vulcanization.

The belt of the present invention is characterized by exhibiting shrinkage of said polyester fiber cords through thermal contractive forces caused by frictional heat generated by slippage of the belt upon lowering of belt tension during belt running. The minimum tension necessary for transmission of power is recovered, the slippage is eliminated for a while and proper tension is maintained. Such automatic action repeats when it becomes needed again.

10 Claims, 11 Drawing Figures

AUTOMATIC TENSION MAINTAINING TRANSMISSION BELT

This application is a continuation, of application Ser. No. 242,928, filed Mar. 12, 1981 now abandoned which is a continuation-in-part application of Ser. No. 958,410 filed Nov. 7, 1978 now abandoned.

BACKGROUND OF THE INVENTION

1. Field of the Invention

This invention relates to a transmission belt with automatic tension adjustment.

2. Brief Description of the Background of the Invention Including Prior Art

A friction power transmission belt as is used for example in connection with pulleys shows in general belt elongation by bending during use, elongation caused by stretching and compressing and also apparent elongation based on loosening due to wear on both sides and falling into the grooves while in use as is the case with a V-belt. When such belt elongation occurs, the belt tension lowers and the belt is no longer capable of transmitting the desired power and the slip of the belt in use increases suddenly. Thus excessive frictional heat is generated and the belt finally breaks down. Conventionally, in order to avoid such problems, the belt is kept in sufficient tension by adjusting the center distance between the two pulleys or by providing a tension maintaining means such as a tension pulley, which generally requires additional space. Another frequently employed method of providing to a belt sufficient tension is to set the initial tension on the pulleys about 30 to 40 percent higher than the tension required for normally transmitting the prescribed power so as to avoid slackening of the belt. However, this method has the disadvantages that the transmission belt reduces its service life rapidly under the excessive tension. At the same time bending of axles and abrasion of bearings are caused by a greater load than necessary applied to axles and bearings.

For example, in the complex construction of recent automobiles, a transmission belt for transmission of power is set into a narrow space. When the transmission belt becomes loose, adjustment of the tension pulleys for tesioning the belt or replacement of the belt become necessary requiring costly labor.

If a conventional transmission V belt is employed in connection with an automobile engine, the belt tension will decrease from the initial tension of the belt due to its strain increasing in proportion to the running distance. Such elongation of the belt can be caused by (1) apparent elongation since the belt falls into the grooves of the pulleys as a result of the advancing abrasion at the two sides of the belt, (2) elongation of the polyester fiber cords as tension providing members of the V belt based on the cords being subjected to stretching and compressing when under almost constant tension and (3) apparent elongation based on the deformation of the cross-sectional shape of the belt caused by lateral pressure applied to the sides of the belt during running. These three factors can bring about a lowering of the belt tension and an elongation of the belt resulting in belt slipping.

Conventionally, when elongation of a belt occurred, the belt tension was adjusted. In order to decrease the amount of work involved in retensioning of belts or to dispense with the work of retensioning belts, Keefe in U.S. Pat. No. 3,469,001 has suggested to use polyester fiber cords having the property that their elongation at 100° C. and that at 24° C. are almost equal with the purpose of minimizing the elongation of the cords. When this belt is stretched onto pulleys a high tension is needed to avoid slipping and/or retensioning while the belt is becoming longer during use. The lowest initial tension to avoid slip of the belt is a tension with 50 percent or more in extra tension. However, with the belt being installed at such excessive tension onto pulleys, a large force is applied to both axles and bearings and as a result the axles can bend and the bearings can wear out. In addition, problems at the initial stage may increase and it may be easy to break the belt by shock. Thus while there is some improvement provided by the belts of U.S. Pat. No. 3,469,001, in particular elongation as a result of the above mentioned factors (1) and (3) remains unimproved and in the course of time belt tension will decrease gradually. Alternatively, if the belt of U.S. Pat. No. 3,469,001 is installed on pulleys at a tension lower than the minimum tension required for power transmission, the belt slips immediately after the start of running the belt and the belt has to be retensioned.

U.S. Pat. No. 3,469,001 employs in example 1 a polyester yarn of a relative viscosity of about 50 and in examples 2 and 5 a polyester yarn of a relative viscosity of 31.5 as measured in a 10 percent solution of the polymer in a mixture of 10 weight parts of phenol and 7 weight parts of 2,4,6-trichlorophenol at 25° C. Relative viscosities of 50 and 31.5, respectively, as determined by the cited method are equivalent to relative viscosities of 0.84 or 0.66 when employing orthochlorophenol as a solvent for determining the viscosity. Polyester cord prepared from polyester with these viscosity properties resulted in a shrinkage tension after thermal stretching of from about 0.31 to 0.39 g/D as measured at 160° C. Also the thermal stretching is performed in one step at a comparatively high elongation percentage of from about 4.5 to 12.3 percent of the belt length.

The polyester fiber cords employed in typical conventional belts are made of polyester fiber yarn having the following characteristics:

Relative viscosity: 0.60 to 0.70 (dissolved in orthochlorophenol)

Tenacity: 7.5 to 8.5 g/D

Elongation: 11 to 15 percent

Heat shrinkage: 5 to 10 percent (held for 30 Minutes at 150° C.)

Shrinkage tension: 0.2 to 0.4 g/D (at 180° to 215° C.) (maximum tension)

In the above properties, g/D represents gram per denier of the fiber. The relative viscosity of the polyester fiber yarn was obtained by dissolving 2 gram of polyester fiber in 25 ml orthochlorophenol; then the viscosity was measured by a Ostwald's viscosimeter; the measured value was divided by the viscosity of orthochlorophenol, multiplied by 0.024 and thereto added 0.02634.

British Pat. No. 1,190,306 to Arntz discloses improvements in V-belt manufacture by vulcanizing a belt under tension caused by a tensile standard load, stretching the belt to bring it to its normal length and cooling the belt to stabilize it at said nominal length.

Waugh in U.S. Pat. No. 4,137,787 employs a cylindrical curing mandrel having a smaller diameter than the diameter of the forming mandrel. Fix in U.S. Pat. No. 3,566,706 discloses that heat-shrinkable elastic or partially elastic cords are simultaneously heat set and relaxed in the absence of applied tension after a rubber to textile bonding agent has been applied.

SUMMARY OF THE INVENTION

1. Purposes of the Invention

It is an object of the present invention to provide a power transmission belt with automatic adjustment of tension.

It is another object of the present invention to provide power transmission belts, which do not need to be retensioned.

It is a further object of the present invention to provide a power transmission belt having sufficient tension for power transmission over extended times without placing excessive forces on axles and bearings of the pulleys.

These and other objects and advantages of the present invention will become evident from the description which follows.

2. Brief Description of the Invention

The present invention provides a power transmission belt which comprises a rubber belt and polyester fiber cords having a relative viscosity as measured in an orthochlorophenol solution at room temperature of from about 0.90 to 1.30 and which have been subjected to a hot stretching process of more than 5 percent of the length of the cord and which are embedded in said rubber under conditions substantially maintaining the strain of the polyester cord during vulcanization.

Preferably, the relative viscosity of the polyester as measured in an orthochlorophenol solution at room temperature is from about 0.90 to 1.10. Initially, the polyester fiber cord can have a maximum shrinkage tension of from about 0.40 to 0.55 g/D at temperatures from about 180° C. to 215° C. The hot stretching can be performed in a two stage or multistage process and after the hot stretching the polyester fiber cord can have a shrinkage tension of at least about 0.5 g/D at 160° C. During vulcanization the shrinkage of the polyester fiber cord is preferably less than 0.3 percent of the length of the cord after stretching cord. Polyester fiber yarn employed in the present invention can have an elongation to the breaking point of from about 12 to 15 percent.

The amount of strain of the belt from a load corresponding to a certain transmission tension at room temperature be designated as A as a percentage of the length of the belt, the amount of strain of the belt from a load corresponding to said certain transmission tension at 80° C. be designated as B as a percentage of the length of the belt and the allowable percentage of elongation C of the belt in percent of the belt length is provided for stretching of the belt before tensioning of the belt occurs induced by the heat generated by slippage. The following relationship is to be met:

$$A - B > C$$

C is from about 0.10 to 0.40 percent of the length of the belt and actual values for C are from about 0.30 to 0.40 percent of the length of the belt. The difference A−B can be larger than 0.45 percent of the length of the belt. Preferably, the difference A−B can be larger than 0.6 percent of the length of the belt.

The belt structure of the power transmission belt of the present invention can have the polyester fiber cords embedded in adhesive rubber which is joined with bottom rubber through a medium of carcass and canvas can be provided at the upper and lower surfaces thereof. The belt structure can have alternatively polyester fiber cords embedded in adhesive rubber integrated with bottom rubber and canvas can be provided at the upper and lower surface thereof. The belt structure can also have polyester fiber cords embedded in adhesive rubber which is joined with the bottom rubber through a medium of a rubber layer reinforced with fiber and canvas can be provided at the upper and lower surface thereof.

In one aspect of the present invention a method is provided for production of power transmission belts comprising winding surface canvas onto a mandrel, winding adhesive rubber sheet onto said surface canvas, subjecting polyester fiber cords comprising polyester having a relative viscosity as measured in orthochlorophenol solution at room temperature of from about 0.90 to 1.30 to a hot stretching process, winding spirally the resulting polyester fiber cords onto said adhesive rubber sheet, winding adhesive rubber sheet onto said cords, winding bottom rubber sheet onto said adhesive rubber sheet of the preceding step, winding undersurface canvas onto said bottom rubber sheet, vulcanizing, cooling down the vulcanized product while on the mandrel and removing the vulcanized product from the mandrel and cutting it into a belt.

In another aspect of the invention a method is provided for production of power transmission belts comprising winding undersurface canvas onto a cylindrical mandrel, winding a bottom rubber sheet onto said undersurface canvas, winding carcass onto said bottom rubber sheet, winding adhesive rubber sheet onto said carcass, subjecting polyester fiber cords comprising polyester having a relative viscosity as measured in an orthochlorophenol solution at about room temperature of from about 0.90 to 1.30 to a hot stretching process, winding spirally the resulting polyester fiber cord onto said adhesive rubber sheet, winding a second adhesive rubber sheet onto said cords, winding surface canvas onto said second adhesive rubber sheet, vulcanizing, cooling down the vulcanized product while on the mandrel, removing the vulcanized product from the mandrel and cutting it into a belt.

In a further aspect of the present invention a method is provided for production of power transmission belt comprising winding undersurface canvas on acylindrical mandrel, winding bottom rubber sheet onto said undersurface canvas, winding rubber sheet reinforced with fiber onto said bottom rubber, winding adhesive rubber sheet onto said rubber sheet reinforced with fiber, subjecting polyester fiber cord comprising polyester having a relative viscosity as measured in an orthochlorophenol solution at about room temperature of from about 0.90 to 1.30 to a hot stretching process, winding spirally the resulting polyester fiber cords onto said adhesive rubber sheet, winding a second adhesive rubber sheet onto said cords, winding surface canvas onto said second adhesive rubber sheet, vulcanizing, cooling down the vulcanized product while on the mandrel, removing the vulcanized product from the mandrel and cutting it into a belt.

In the above methods of production of a power transmission belt, the relative viscosity of the polyester as measured in an orthochlorophenol solution at about room temperature can be from about 0.90 to 1.10. The polyester cord before the hot stretching can have a maximum shrinkage tension of from about 0.40 to 0.55 g/D at temperatures from about 180° to 215° C. The hot stretching process can be a two stage or multistage process. After the hot stretching process the polyester fiber cord can have a maximum shrinkage tension of at least about 0.5 g/D at 160° C. The vulcanizing can be performed under conditions providing a shrinkage of less than about 0.3 percent of the length of the cord. The hot stretching can result in a strain of at least about 5 percent of the length of the cord. The polyester fiber yarn employed can have an elongation to the breaking point of from about 12 to 15 percent. Preferably the mandrel is from metal.

There is also provided a method for maintaining the tension in a rubber belt employed in power transmission by automatically adjusting the length of the belt upon slippage by using the heat generated by the slippage friction for providing tensioning to the belt. A rubber belt with polyester fiber cords is provided comprising polyester having a relative viscosity as measured in an orthochlorophenol solution at room temperature of from about 0.90 to 1.30 where the polyester fiber cords have been subjected to a hot stretching process and where the polyester fiber cords have been embedded in said rubber under conditions substantially maintaining the strain of the polyester fiber cord upon vulcanizing.

The strain amount of the belt from a load corresponding to a certain transmission tension at room temperature can be A as a percentage of the length of the belt, the amount of strain of the belt from a load corresponding to said certain transmission tension at 80° C. can be B as a percentage of the length of the belt and the allowable percentage of elongation C of the belt is provided for stretching of the belt before tensioning of the belt occurs as induced by the heat generated by slippage friction. Then in the method for maintaining tension in a rubber belt employed in power transmission the following relationship can be met:

$$A - B > C$$

C is from about 0.10 to 0.40 percent of the length of the belt and actually from about 0.30 to 0.40 percent of the length of the belt. A−B can be larger than about 0.45 percent of the length of the belt preferably, can be larger than 0.6 percent. The relative viscosity of the polyester used in the method of maintaining belt tension as measured in an orthochlorophenol solution at about room temperature can be from about 0.90 to 1.10 and the polyester fiber yarn can have an initial shrinkage tension from about 0.40 to 0.55 g/D at temperatures from about 180° to 215° C. and an elongation to breakage of from about 12 to 15 percent. The polyester cord can be subjected to a two stage or multistage hot stretching process and the strain resulting from the hot stretching process is perferably at least about 5 percent of the length of the belt. After the hot stretching process the polyester fiber cord employed in the method for maintaining belt tension can have a shrinkage tension of at least about 0.5 g/D when measured at 160° C. The shrinkage of the polyester cord during vulcanization can be less than 0.3 percent of the length of the cord for belts employed in the method for maintaining the tension in a rubber belt.

The invention accordingly consists in the features of construction and series of steps which will be exemplified in the article of manufacture and method hereinafter described and of which the scope of application will be indicated in the appended claims.

BRIEF DESCRIPTION OF THE DRAWING

In the accompanying drawing in which are shown several of the various possible embodiments of the invention.

DESCRIPTION OF INVENTION AND PREFERRED EMBODIMENTS

In accordance with the present invention a power transmission belt is provided comprising rubber constituting the belt and polyester fiber cords subjected to a hot stretching process embedded in said rubber by a vulcanization method maintaining the thermal force of the polyester fiber cords during vulcanizing. When the belt is in use the polyester fiber cords shrink by thermal contractional force caused by the heat generated by friction upon slipping of the belt after the belt tension decreased during running and the belt recovers sufficient tension necessary to transmit power and to discontinue slipping. The transmission belt according to the present invention is manufactured by embedding polyester fiber cords, which are made by twisting polyester fiber yarn having a high relative viscosity and a high maximum shrinkage tension and which are subjected to a hot stretching process into the rubber constituting the belt by such vulcanization as to maintain the thermal construction force of the polyester fiber cords while the rubber is vulcanized.

Figure 1:
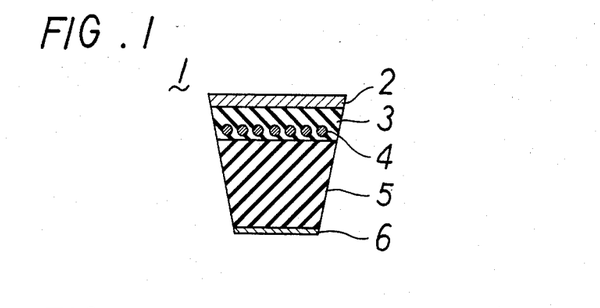
FIG. 1 is a cross-section of a belt according to one embodiment of the present invention.
Figure 2:
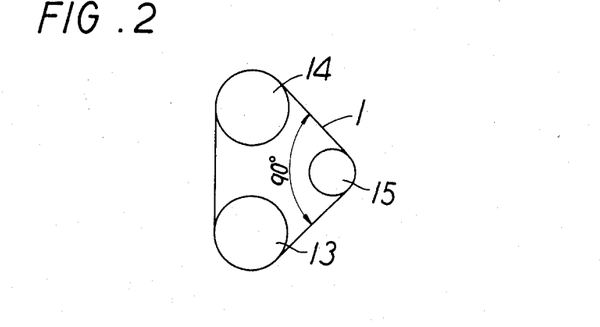
FIG. 2 is a cross-section of a belt according to another embodiment of the present invention.
Figure 3:
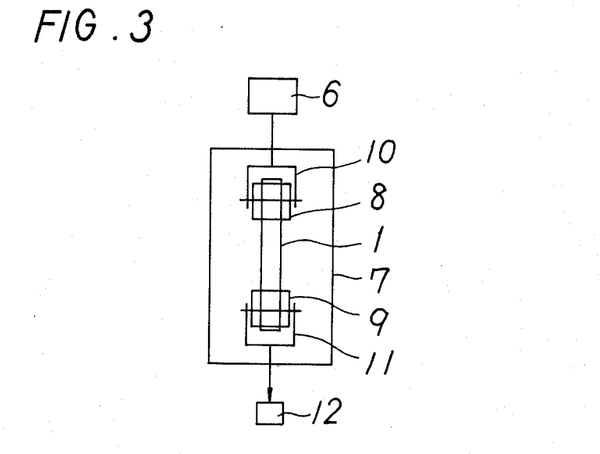
FIG. 3 is a cross-section of a belt according to still another embodiment of the present invention.

Referring now to FIGS. 1 to 3, there is shown, respectively, a cross-section of a V-belt 1a-1c, wherein numeral 2a denotes a surface canvas, 2b a bottom canvas, 3 adhesive rubber, 4 a polyester fiber cord to which a special stretching process has been applied and 5 a bottom rubber.

In FIG. 2, numeral 2c denotes a carcass. In FIG. 3, numeral 2d denotes a rubber layer containing reinforcing fibers disposed at a right angle relative to the direction of the cord 4.

The polyester fiber cord designated above as 4 was produced by twisting polyester yarn of ingredients such as employed in conventional polyester yarns, e.g., polyethyleneterphthalate can have the following properties:

Relative viscosity: 0.90 to 1.30 (dissolved in orthochlorophenol)
Tenacity: 8.5 to 9.5 g/D
Elongation: 12 to 15 percent (elongation at break)
Heat shrinkage: 8 to 11 percent (held for 30 minutes at 130° C.)
Shrinkage tension: 0.4 to 0.55 g/D (the maximum tension at 180° to 215° C.)
where:

g=gram
D=Denier of the fiber

The relative viscosity etc. were measured in the conventional way.

1,100 denier exemplifies the above-cited polyester fiber yarn and 2×5 exemplifies the twisting construction of the cord.

The above mentioned cord 4 is given an adhesive application treatment and is subjected to a hot stretching process. Suitable adhesives to be employed include those of the isocyanate type, the epoxy type, RFL, etc.

The hot stretching process is carried out as a multistage process where the strain is at least 5 percent of the length of the polyester fiber cord. Preferably, the stretching percentage of the individual stages should be increased gradually with the progress of the stretching process. Preferred conditions of the hot stretching process include for example treatment temperatures of from about 220° C. to 240° C. with a medium of about 230° C., the time duration of hot stretching can be from about 30 to 300 seconds with a preferred duration of about 120 seconds. A preferred procedure of two stage stretching provides for 2 percent first stage stretching and 4 percent second stage stretching. After the hot stretching process has been performed, the polyester fiber cords are embedded into the rubber constituting the belt as a tensible member. The polyester fiber cords are preferably embedded in adhesive rubber 3. During vulcanization of the rubber care should be taken that the shrinkage properties of the cords when subjected to heat are not impaired. If the cords having a very high thermal contraction force shrink considerably during vulcanization, the cords will be buried in the bottom rubber 5 and their arrangement will be disordered. Therefor, it is necessary to prevent excessive shrinkage of the polyester fiber cords during vulcanization. This can be done by increasing the viscosity of the bottom rubber 5 or by constructing the belt in such manner that the carcass 2c or the rubber layer 2d containing reinforcing fibers oriented in a direction at right angle to the direction of the cords 4 are interposed between the cord 4 and the bottom rubber 5. Another step which can be taken is to carry out the vulcanization at a relatively low temperature. There can also be a combination of a vulcanizing process at relatively low temperature, of an increase in the viscosity of the bottom rubber or of laying a woven fabric or a rubber layer containing fibers disposed in a direction perpendicular to the direction of the cord under said cord in order to limit shrinkage of the cord and to maintain contraction when subjected to heat. Thus it is possible to keep the percentage of the cord length contraction from before to after vulcanization to less than about 0.3 percent and to maintain a high shrinkage tension of the cord even after vulcanizing, whereby the belt can shrink by frictional heat caused by belt slipping and thereby recover from a decrease in belt tension.

In the following the manufacturing process of the V-belt of the above-mentioned construction is explained in more detail.

Referring to a first example of a manufacturing process of the V-belt constructed as shown in FIG. 1, a surface canvas 2a and an adhesive rubber sheet 3 are wound on a cylindrical metal mandrel in the sequence as stated, then polyester cord is subjected to a hot stretching process and after the hot stretching process is wound spirally onto the adhesive rubber sheet 3. This is followed by winding onto the cord 4 the adhesive rubber sheet 3, the bottom rubber sheet 5 and the bottom canvas 2b, and finally they are integrated into the belt by vulcanization in a conventional way and by employing conventional devices. Preferably, the vulcanization is performed such that temperatures leading to thermal contraction of the polyester fiber cords are avoided. After vulcanization, the belt structure is cooled down to below 40° C. while still wound on the mandrel so as to prevent the polyester fiber cord buried in the belt from shrinking in the course of cooling down. Then the cured belt is taken off from the mandrel and is cut into the desired belt shape. The above described process is called the "inverted building method". In this production process the contraction forces of the cord 4 do not act on the bottom rubber 5 and thereby the polyester fiber cord 4 is prevented from being buried in the bottom rubber 5. Thus by controlling the percentage of shrinking of the cord 4 between before and after vulcanization and keeping the percentage below about 0.3 percent of the length of the cord, a lowering of the thermal contraction force can be kept within narrow limits.

Referring next to an example of a manufacturing process for the V-belt 1b or 1c as shown in FIGS. 2 or 3, the bottom canvas 2b and the bottom rubber sheet 5 are wound on a cylindrical metal mandrel. Then the carcass 2c or the rubber sheet 2d containing reinforcing fibers oriented in a direction with a component at a right angle to the direction of the cord 4 (rubber sheet reinforced with short fiber) is wound on the bottom rubber sheet 5 and this is followed by winding onto the bottom rubber 5 of the adhesive rubber sheet 3 and thereon in turn the polyester fiber cord 4 after it has been subjected to a hot stretching process. Onto the cord is wound an adhesive rubber sheet 3 and the surface canvas 2a and this completes the belt structure. The belt structure is then vulcanized and cooled down by a process similar to that indicated in the above "inverted building method", the belt is removed from the mandrel and cut into the desired shape.

The here described manufacturing process is called "up-right building method" and the thermal contraction force of the cord 4 acts on the carcass 2c or the rubber sheet reinforced with fiber 2d and thereby the cord 4 is prevented from being buried in the bottom rubber 5. Thus, the percentage of shrinking of the cord 4 between before and after the vulcanization process can be kept below 0.3 percent and a lowering of the thermal contraction force of the cord is minimized.

While the V-belt of the above described construction is running, the belt tension is lowered by appearance of elongation of the cord and of apparent elongation of the cord due to abrasion and deformation of the belt. When the belt tension decreases below the minimum tension required for transmitting the power, belt slip takes place and heat is accumulating in the belt from the frictional heat generated by slippage friction. When the temperature of the V-belt rises to above 80° C., the above mentioned polyester fiber cords 4 embedded in said V-belt 1 shrink by their thermal contraction force indirectly resulting from the lowering of the belt tension. If the cords 4 shrink in excess of the belt percentage of elongation at which belt slip took place, then the belt recovers to the minimum tension necessary for transmission of power and consequently belt slip is stopped. In response to the stoppage and elimination of belt slippage, the belt temperature decreases and accordingly the cord 4 ceases to shrink.

When the V-belt again elongates due to its continued running and belt slip takes place again, then the belt tension recovers again automatically to the minimum tension necessary for the transmission of power and the tension is maintained at a regular level. In short, whenever the above described V-belt 1 elongates irrespective of the causes of elongation, it shrinks thereupon and recovers its tension in response to the elongation.

As mentioned above, in order to enable the V-belt 1 to have the automatic tensioning action property, it is essential that the polyester fiber cords embedded in the V-belt 1 possess a very high thermal contraction force. For increasing the thermal contracting force of the cord 4, first the polyester fiber yarn itself must exhibit a high relative viscosity (0.90 to 1.30) and a high shrinkage tension (0.40 to 0.55 g/D), second the hot stretching process to be applied to improve the thermal contraction force of the cord 4 has to be based on at least two stage stretching of more than 5 percent of the length of the cord as strain and third the thermal contraction force improved by the hot stetching process must not be lowered during the vulcanization process. These three requirements must be met simultaneously. If the relative viscosity of the starting material polyester yarn is increased, its strength, heat shrinkage and thermal contraction force will increase at the same time and for the purposes of the present invention there results an improvement in the thermal contraction force and in its characteristics relating to increased temperature sensitivity. Similarly, the hot stretching process by multi-stage stretching at more than 5 percent stretching results in a higher heat shrinkage and a higher thermal contraction force with the result of the improved temperature sensitivity characteristic. Thus, heat induced shrinkage occurs about immediately in response to the rise in belt temperature upon belt slipping and consequently tension is recovered soon. It is noted however, that it has been difficult to manufacture polyester fibers having a relative viscosity of more than 1.30.

In the following there are explained the results of tests carried out to determine the presence of a tension recovering property in the above described V-belt and to specify such property and characteristic.

EXAMPLE I

I. Static Test (a) Testing apparatus

Figure 4:
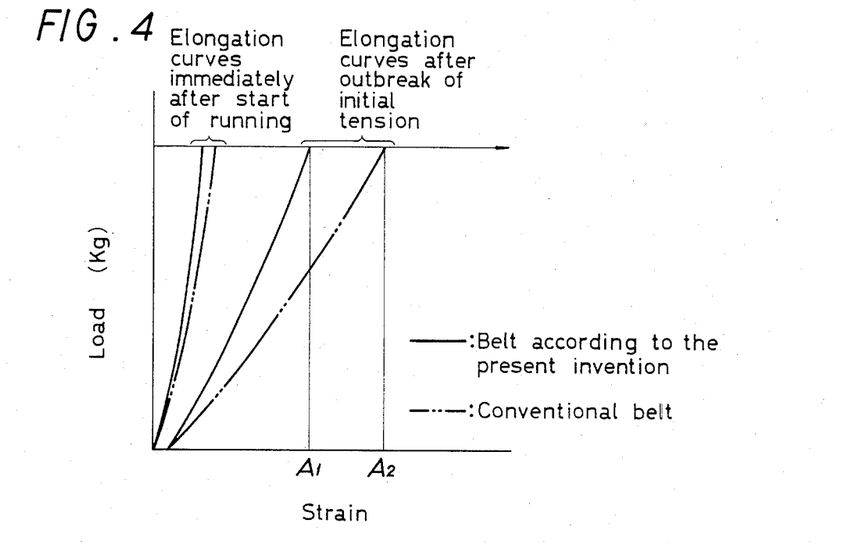
FIG. 4 and FIG. 5 show respectively a schematic diagram of a testing apparatus for a V-belt.

A testing apparatus as shown in FIG. 4 was used. V-belt 1 is for testing purposes placed on the flat pulleys 8,9 supported by pulley holders 10, 11 in such a way that its back side makes contact with the pulley. The test device is placed in a thermostatically controlled chamber. The pulley holder 10 is hung on a load cell 6 and a weight for loading 12 is suspended from the pulley holder 11.

(b) Testing method

In this procedure the above described V-belt 1 is placed in a condition closely resembling the conditions of actual running and its characteristics are obtained. The testing procedures 1 to 6 were carried out at room temperature (20° C. to 25° C.).

Test procedure 1

The V-belt 1 is placed on the pulleys 8,9 with its back side in contact with the pulleys.

Test procedure 2 (Center distance $X_1$)

A load $W_1$ (⅛th of the tenacity at break) is applied to the V-belt 1 and in this position the center distance $X_1$ is read. The V-belt 1 is left for 10 minutes as it is and a load $W_2$ is read after relaxation of force. The load $W_1$ corresponds to an initial tension at the time when the belt is fitted, in other words, the procedure 2 sets the condition at the initial stage of belt fittng.

Test procedure 3

The V-belt is to be pulled at a stretching speed of 10 mm/minute. A load $W_3$ being one-fifth of the tenacity at break is applied and left for one minute and then the load $W_2$ is put back at the speed of 10 mm/minute and left for 30 seconds. This operation is repeated three times.

The load $W_3$ corresponds to the transmission tension acting upon the tight side while the belt is running and the load $W_2$ corresponds to the tension on the slack side. In other words, the procedure 3 sets the conditions in which each point of the belt passes the tight side and the slack side according to the running of the belt.

Test procedure 4 (Center distance $X_2$)

The V-belt is pulled at the stretching speed of 10 mm/minute. A load $W_3$ being one-fifth of the tenacity at break is applied and left for one minute and the distance is put back to $X_2$ (position of $0.996 \times X_1$) at the speed of 10 mm/minute and left for two minutes.

The center distance $X_2$ moves the pulley so as to make the V-belt generate an apparent elongation. The displacement of the pulley corresponds to the elongation percentage (allowable percentage of elongation) at which slip occurs in actual belt running. In other words, the procedure 4 sets the conditions in which the belt is elongated similar as caused by running the belt. The allowable elongation percentage C is $[X_1 - X_2/X_1] \times 100$.

Test procedure 5 (strain A and center distance $X_3$)

The V-belt is pulled at the stretching speed of 10 mm/minute. The load $W_3$ is applied and left for two minutes and a center distance $X_3$ is read.

Strain A = $[X_3 - X_2)X_1] \times 100$

Strain A is a strain at room temperature and at a load $W_3$ corresponding to the transmission tension and corresponds to the strain to which the V-belt is subjected during belt running. The larger the value of the strain, the more belt slipping tends to take place.

Test procedure 6

The distance is put back to the value $X_2$ at the speed of 10 mm/minute and then left there for two minutes.

Test procedure 7

Hot air is blown into a thermally insulated chamber 7 at the condition where the load $W_2$ is applied after relaxing of the stress and it is continued to heat at 80° C. until the contractive force has become constant in the hot air.

The heating temperature corresponds to the temperature of the belt when heated by the frictional heat produced by belt slippage, namely, procedure 7 sets conditions under which the belt slips due to its elongation and generates temperatures of 80° C. resulting from friction generated heat and then shrinks.

Test procedure 8

The belt is pulled up to the load of $W_3$ at the stretching speed of 10 mm/minute and a center distance of $X_4$ is read at that time.

Strain B=[$(X_4-X_2)/X_1$]×100

The Strain B is a strain at a temperature of 80° C. and at a load $W_3$ corresponding to the transmission tension related to the strain to which the V-belt is subjected when the belt generated frictional heat. The smaller the value of this strain, the easier it becomes to remove the slipping of the belt.

(c) Test results

There are shown below each load of $W_1-W_4$ and each center distance of $X_1-X_4$, together with the strain A, strain B obtained from the load and the center distance and an allowable percentage of elongation for a conventional V belt as compared with the present invention V-belt.

|  | V-belt according to the present invention | Conventional V-belt |
| --- | --- | --- |
| $W_1$ | 56 kg | 56 kg |
| $W_2$ | 48.5 kg | 44.5 kg |
| $W_3$ | 90 kg | 90 kg |
| $X_1$ | 413.3 mm | 415.0 mm |
| $X_2$ | 411.647 mm | 413.34 mm |
| $X_3$ | 416.069 mm | 418.237 mm |
| $X_4$ | 413.362 mm | 417.013 mm |
| Strain A | 1.07 percent | 1.18 percent |
| Strain B | 0.415 percent | 0.885 percent |
| A-B | 0.655 percent | 0.295 percent |
| C | 0.400 percent | 0.400 percent |

It can be recognized from the above test results that in order to provide the V-belt with the automatic tensioning action whereby the belt shrinks upon belt slipping and recovers its tension, it is required that the belt generates a thermal contractive force when the temperature raises to about 80° C. and that the strain B as determined at 80° C. is smaller than the strain A as determined at room temperature. Also it is required that the difference between the two strains or A−B is larger than the percentage of the belt length changed by elongation C at the belt slipping, in other words, the belt tension after shrinking due to generation of thermal contractive force should be the tension at the time prior to belt slipping.

With regard to the above stated requirements, both the V-belt according to the present invention and certain conventional V-belts satisfy the requirement of B<A. However, regarding the relation between A−B and the allowable percentage of elongation C, the V-belt of the present invention satisfies C<A−B, whereas the conventional V-belt satisfies A−B<C. This means that while the V-belt according to the present invention possesses automatic tensioning action properties, certain conventional V-belts show thermal shrinkage to some extent, but such thermally induced shrinkage is insufficient there to remove belt slipping. This result is confirmed by tests in accordance with the dynamic test described below.

EXAMPLE II

II. Dynamic test

Experiment I (a) Testing apparatus

Figure 5:
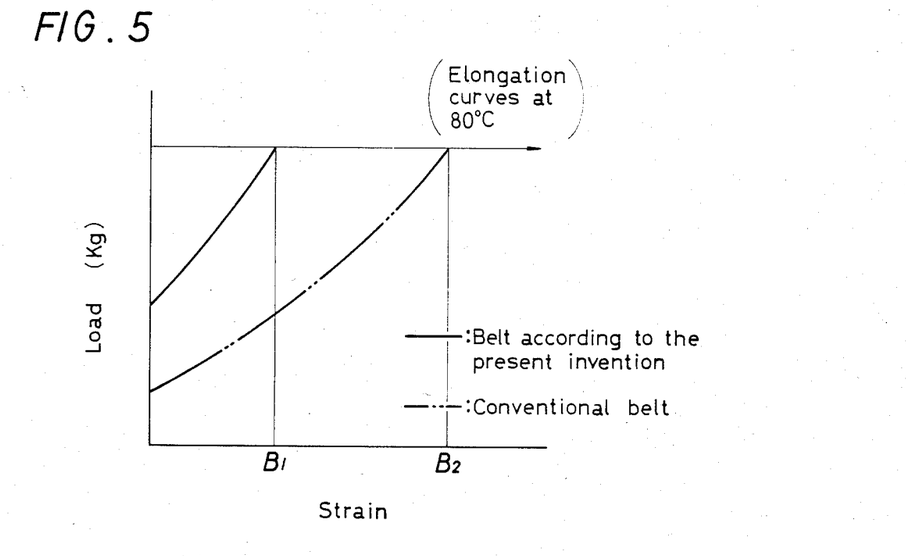

The testing apparatus as shown in FIG. 5 was used. The V-belt 1 was installed on the driving side, the driven side and on the idle pulleys 13, 14 and 15 with locations as shown in FIG. 5 and the running test was carried out with the belt span initial tension set at 30 kg by a belt tension gauge. The diameter of the V-grooved pulleys 13, 14, the diameter of the V-grooved idle pulley 15, the number of revolutions of the V-grooved pulley 13 on the driving side and the shaft load on the driven side were 127 mm, 76.2 mm, 4,700 r.p.m. and 13 pounds respectively. A V-belt of A-shape and a belt length of 40" (I.S.O. Recommendation R608) was used.

(b) Test results

Figure 6:
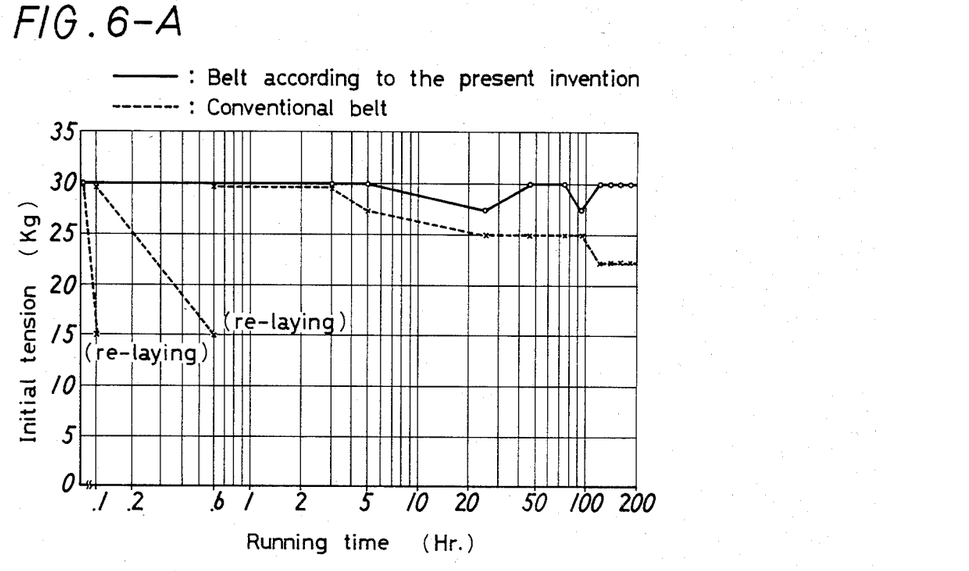
FIG. 6A and FIG. 6B show respectively in a diagram the relation between belt tension and running hours as obtained as a result of the running tests described in Examples I to III.

Test results as shown in FIG. 6 were obtained. In order to maintain the span tension of 30 kg, the conventional V-belt must be re-tensioned twice, 0.1 hour and 0.6 hour after the start of the running, but the V-belt according to the present invention does not require re-tensioning by adjustment of pulley distance. In this test, while the V-belt in accordance with the present invention retained the original span tension of 30 kg even after the lapse of 200 hours after the start of the running, the conventional V-belt lowered its tension to the level of 22 kg, in spite of the re-tensioning effected twice at an early stage after the start of the running, but nevertheless continued to lower its tension with the result of showing difficulty in transmitting the predetermined power. Thus further retensioning was required for the conventional V-belt.

EXAMPLE III

Experiment II (a) Testing apparatus

The same testing apparatus as employed in Experiment I (see FIG. 5) was used. The V-belt was installed on the driving side, the driven side and idle pulleys 13, 14, 15, with the belt span initial tension set at 10 kg by a belt tension gauge and the running test was carried out. The diameter of the V-grooved pulleys 13, 14, the diameter of the idler V-grooved pulley 15, the number of revolutions of the V-grooved pulley 13 on the driving side, and the shaft load on the driven side were 127 mm, 76.2 mm, 4,700 r.p.m. and 13 pounds respectively. V-belt 1 of A-shape and belt length 40" was used.

(b) Test results

Figure 7:
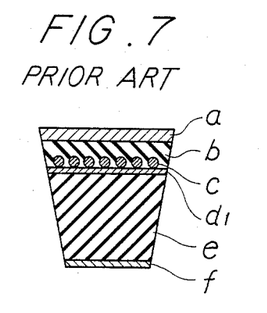
FIGS. 7, 8 , 9 and 10 show various prior art belt arrangements.
Figure 8:
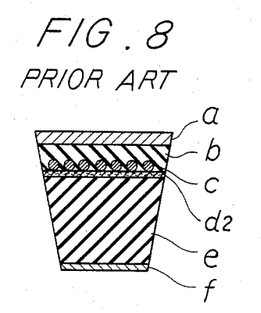
Figure 9:
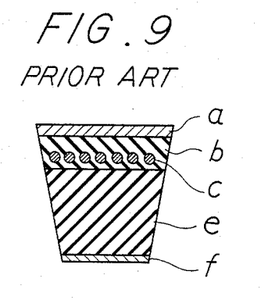
Figure 10:
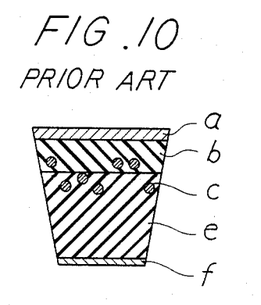

Test results were obtained as shown in FIG. 7. As the span tension was set at 10 kg, which was less than the lowest span tension for load transmission, the conventional V-belt was broken down within only 0.1 hour after the start of running due to sudden slip, whereas the belt according to the present invention regained the span tension of 30 kg soon after the start of running and thereafter maintained the span tension of 30 kg. Similarly as was observed in the case of Experiment I, since the belt according to the present invention shrinks due to heat generation by slip friction or has automatic tensioning action, it does not require retensioning at all and provides recovery of tension by its own automatic tensioning action properties, even if its tension was initially set below the lowest tension necessary for load transmission.

In addition, various test specimens were prepared of polyester fiber material yarn by varying the relative viscosity (0.7, 0.9, 1.01), the stretching process (one-stage stretching at 3 percent and 5 percent and two-stage stretching at 5 percent or more) and the percentage of shrinking of polyester fiber cords between before and after the vulcanizing process (0.3 to 1.3 percent), and each test specimen was tested to obtain the value of the thermal contractive force, based on which the value of the thermal contactive force was obtained. Also, from the results of the above-described static test and the results of the dynamic test (Experiment I), the existence of automatic tensioning action for each test specimen was confirmed, as shown in the following Table 1 and 2.

In Table 1 and Table 2 polyester yarn of 1100 deniers, polyester fiber cords of 2×5 twist construction and belts of A-shape and belt length of 40" were used. The maximum shrinkage tension is the maximum value at temperatures ranging from 180° C. to 215° C. The thermal contractive force was measured at 160° C. according to the method described for determining the thermal contractive force at dry heating. The hot stretching operation was performed at a temperature of 230° C. for the samples No. 1 to 13 in Tables 1 and 2 and at 215° C. for the samples No. 14 to 17 in Tables 1 and 2 and the exposure time was 120 seconds.

TABLE 1

| Sample No. | Polyester fiber material yarn | | Hot stretching process Stretching percentage | | Polyester fiber cord after stretching at 160° C. | | Shrinkage percentage of cord before and after vulcanization (%) |
|---|---|---|---|---|---|---|---|
| | Relative viscosity | Maximum shrinkage tension (g/D) | 1st stage (%) | 2nd stage (%) | Thermal Contractive force (kg) | Shrinkage tension (g/D) | |
| 1 | 0.70 | 0.31 | 3 | 0 | 2.86 | 0.26 | 0.4 |
| 2 | 0.70 | 0.31 | 3 | 0 | 2.86 | 0.26 | 0.3 |
| 3 | 0.70 | 0.31 | 5 | 0 | 3.85 | 0.35 | 0.6 |
| 4 | 0.70 | 0.31 | 5 | 0 | 3.85 | 0.35 | 0.3 |
| 5 | 0.70 | 0.31 | 2 | 3 | 4.18 | 0.38 | 0.9 |
| 6 | 0.70 | 0.31 | 2 | 3 | 4.18 | 0.38 | 0.3 |
| 7 | 0.90 | 0.45 | 3 | 0 | 4.29 | 0.39 | 0.9 |
| 8 | 0.90 | 0.45 | 3 | 0 | 4.29 | 0.39 | 0.3 |
| 9 | 0.90 | 0.45 | 5 | 0 | 5.50 | 0.50 | 1.1 |
| 10 | 0.90 | 0.45 | 5 | 0 | 5.50 | 0.50 | 0.3 |
| 11 | 0.90 | 0.45 | 2 | 3 | 6.20 | 0.56 | 1.3 |
| 12 | 0.90 | 0.45 | 2 | 3 | 6.20 | 0.56 | 0.3 |
| 13 | 0.90 | 0.45 | 2 | 4 | 7.00 | 0.64 | 0.3 |
| 14 | 0.90 | 0.45 | 2 | 4 | 7.26 | 0.66 | 0.3 |
| 15 | 1.01 | 0.50 | 2 | 4 | 7.56 | 0.69 | 0.9 |
| 16 | 1.01 | 0.50 | 2 | 4 | 7.56 | 0.69 | 0.3 |
| 17 | 1.01 | 0.50 | 5 | 0 | 5.94 | 0.42 | 0.3 |

TABLE 2

| Sample No. | Polyester fiber cord after vulcanizing at 160° C. | | Results of static tests Strain (%) | | | Time run until re-tension (h) | Existence of automatic tensioning action |
|---|---|---|---|---|---|---|---|
| | Thermal contractive force (kg) | Shrinkage tension (g/D) | A | B | A − B | | |
| 1 | 2.00 | 0.18 | 1.21 | 0.926 | 0.284 | 0.1 | none |
| 2 | 2.29 | 0.21 | 1.20 | 0.905 | 0.295 | 0.1 | none |
| 3 | 2.31 | 0.21 | 1.18 | 0.885 | 0.295 | 0.1 | none |
| 4 | 3.08 | 0.28 | 1.14 | 0.828 | 0.312 | 1 | none |
| 5 | 2.30 | 0.21 | 1.17 | 0.879 | 0.291 | 0.1 | none |
| 6 | 3.34 | 0.30 | 1.12 | 0.795 | 0.325 | 1 | none |
| 7 | 2.36 | 0.21 | 1.15 | 0.840 | 0.310 | 0.5 | none |
| 8 | 3.43 | 0.31 | 1.12 | 0.770 | 0.350 | 45 | none |
| 9 | 3.03 | 0.28 | 1.14 | 0.805 | 0.335 | 10 | none |
| 10 | 4.40 | 0.40 | 1.10 | 0.707 | 0.393 | 85 | none |
| 11 | 2.79 | 0.25 | 1.13 | 0.794 | 0.336 | 10 | none |
| 12 | 4.96 | 0.45 | 1.09 | 0.637 | 0.453 | 200* | exists |
| 13 | 5.60 | 0.51 | 1.07 | 0.415 | 0.655 | 200* | exists |
| 14 | 5.81 | 0.53 | 1.06 | 0.401 | 0.659 | 200* | exists |
| 15 | 4.16 | 0.38 | 1.07 | 0.698 | 0.372 | 80 | none |
| 16 | 6.00 | 0.55 | 1.05 | 0.381 | 0.669 | 200* | exists |
| 17 | 4.75 | 0.42 | 1.09 | 0.694 | 0.396 | 110 | none |

*Test was discontinued at this point without any retensioning.

In the Tables 1 and 2 samples 12, 13, 14 and 16 represent transmission belts having automatic tensioning action properties. These samples required no retensioning even after 200 hours of running. Those samples showing a relative viscosity of 0.7 (samples No. 1 to 6) of the polyester were low in the maximum shrinkage tension (0.31 g/D) of the polyester fiber yarn material and therefor, the shrinkage tension of the belt containing the cord after vulcanization was small (at most about 0.30 g/D), although they had been stretched in a two stage stretching process of up to 5 percent of the length of the cord and their shrinkage percentage at vulcanizing was made 0.3 percent (sample No. 6). Thus these samples had no automatic tensioning action and required retensioning after only about 1 hour of running.

On the other hand, among the samples showing a relative viscosity of 0.9 or 1.01 and a maximum shrinkage tension of 0.45 g/D or 0.5 g/D for their polyester fiber material yarn (samples No. 7 to 17), those which were stretched at 3 percent in the hot stretching process (samples 7 and 8) and those which were stretched at 5 percent in but one stage stretching (samples No. 9, 10, 17) exhibited no automatic tensioning action, even though the shrinkage percentage at vulcanization was low and required retensioning after running for from about 0.5 to 110 hours. Even in the case of applying hot stretching in a two stage process of 5 percent or more the samples showing high shrinkage percentage (1.3 and 0.9, respectively) at vulcanizing (sample 11 and 15, respectively) were lower in the shrinkage tension after vulcanizing (0.25 and 0.38, respectively) and as a result they did not show automatic tensioning action and required retensioning after running times of 10 and 80 hours, respectively.

In the above Tables 1 and 2, the conventional V-belt and the V-belt according to the present invention mentioned in the above desribed static test and dynamic test correspond to sample No. 3 L and sample No. 13, respectively.

The above embodiments of the present invention refer to V-belts, but the present invention is not limited to V-belts and is applicable to other types of belts including frictional transmission belts such as flat belts.

As described above, the belt in accordance with the present invention shrinks induced by the heat generated by slip friction or it possesses an automatic tensioning action property, and therefor it has the big advantage of not requiring retensioning. This advantage results in such effects that no excessive load is applied to the belt because the belt can be installed at the desired load transmission tension from the beginning and at the same time the mechanical precision of the shaft can be kept in good condition and the bearings remain free from damage. In addition, the elimination of the need to re-tension the belt brings high efficiency in maintaining machines employing such belts.

It thus will be seen that there is provided a belt which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

What is claimed is:

1. An automatic tension transmission belt having polyester fiber cords embedded therein which shrink at a temperature greater than 80° C., when the belt is operating between two pulleys for the transmission of force therebetween, the frictional heat generated by any slippage during said operation of the belt causes the fiber cords to shrink at operating temperature, thereby increasing the belt tension and eliminating said slippage.

2. A belt according to claim 1, wherein polyester fiber yarn constituting said polyester fiber cords has a relative viscosity in an orthochlorophenol solution of 0.90–1.30.

3. A belt according to claim 1, wherein the approximate range of shrinkage tension of polyester fiber yarn constituting said polyester fiber cords is 0.40 to 0.55 g/D in a range of temperatures of 180° to 215° C.

4. A belt according to claim 1, wherein said polyester fiber cords have been subjected to a prior treatment of multistage stretching of more than 5 percent prior to being embedded in said belt.

5. A belt according to claim 1, wherein said polyester fiber cords will have substantially no shrinkage in said belt at the time of vulcanizing said belt.

6. An automatic tension transmission belt having polyester fiber cords embedded therein which have a shrinkage tension after vulcanization of at least 0.45/D at 160° C. so that, when the belt is operating between at least two pulleys for the transmission of force therebetween, the frictional heat generated by any slippage during said operation of the belt causes the fiber cords to shrink at the operating temperature, thereby increasing the belt tension and eliminating said slippage.

7. An automatic tension transmission belt having polyester fiber cords which are stretched before being embedded therein and which have a shrinkage tension after stretching and embedding of at least 0.45 g/D at 160° C., so that, when the belt is operating between two pulleys for the transmission of force therebetween, the frictional heat generated by any slippage during said operation of the belt causes the fiber cords to shrink at the operating temperature, thereby increasing the belt tension and eliminating said slippage.

8. An automatic tension transmission belt having polyester fiber cords which are stretched before being embedded therein and which will shrink less than 0.3 percent of the original length at vulcanization and which have a shrinkage tension after stretching and embedding of at least 0.45 g/D at 160° C., so that, when the belt is operating between at least two pulleys for the transmission of force therebetween, the frictional heat generated by any slippage during said operation of the belt causes the fiber cords to shrink at the operating temperature, thereby increasing the belt tension and eliminating said slippage.

9. A tension transmission belt comprising:
a surface canvas;
a layer of adhesive rubber adjoining the surface canvas;
a polyester fiber cord having a shrinkage tension after vulcanization of at least 0.45 g/D at 160° C., and located in the adhesive rubber layer; and a bottom rubber layer located adjacent to the layer of adhesive rubber, said fiber cord tending to shrink as said rubber tends to expand during the operation of said belt, whereby the belt will substantially maintain a constant length and substantially support a constant load.

10. A method for automatically maintaining a substantially constant tension in a transmission belt comprising:
employing a polyester fiber cord imparted with a given minimum shrinkage tension after vulcanization as an embedded member in a rubber core; manufacturing the belt so as to retain the shrinkage characteristics of the polyester fiber cord so that the cord is caused to shrink during belt operation by frictional heat generated during said belt operation; and maintaining said belt in substantially constant tension during operation, wherein said cord will tend to shrink while said rubber tends to expand, said shrinkage and expansion tending to cancel each other.

* * * * *